(12) United States Patent
Geary (10) Patent No.: US 11,153,439 B2
(45) Date of Patent: Oct. 19, 2021

(54) MANAGING AGENT OCCUPANCY IN AN OMNI-CHANNEL ENVIRONMENT

(71) Applicant: Avaya Inc., Santa Clara, CA (US)

(72) Inventor: Dara Geary, Galway (IE)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/166,317

(22) Filed: Oct. 22, 2018

(65) Prior Publication Data

US 2020/0128130 A1 Apr. 23, 2020

(51) Int. Cl.
*H04M 3/523* (2006.01)
*H04M 3/51* (2006.01)

(52) U.S. Cl.
CPC ....... *H04M 3/5141* (2013.01); *H04M 3/5191* (2013.01); *H04M 3/5232* (2013.01)

(58) Field of Classification Search
CPC . H04M 3/5232; H04M 3/5141; H04M 3/5191
USPC .................................................... 379/265.09
See application file for complete search history.

(56) References Cited

U.S. PATENT DOCUMENTS

| 6,044,355 | A | 3/2000 | Crockett et al. | |
|---|---|---|---|---|
| 6,192,122 | B1 | 2/2001 | Flockhart et al. | |
| 6,771,765 | B1 * | 8/2004 | Crowther | H04M 3/523 379/265.09 |
| 7,158,628 | B2 | 1/2007 | McConnell et al. | |
| 7,418,094 | B2 * | 8/2008 | Golitsin | H04M 3/5191 379/265.02 |
| 8,234,141 | B1 | 7/2012 | Flockhart et al. | |
| 8,634,543 | B2 | 1/2014 | Flockhart et al. | |
| 2015/0304497 | A1 * | 10/2015 | Spottiswoode | H04M 3/523 379/265.06 |
| 2016/0119477 | A1 * | 4/2016 | Sharpe | H04M 3/5233 379/265.09 |

* cited by examiner

*Primary Examiner* — Ahmad F. Matar
*Assistant Examiner* — Jirapon Intavong
(74) *Attorney, Agent, or Firm* — Stevens & Showalter LLP (57) ABSTRACT

Managing occupancy of agents in a multi-channel contact center includes receiving an incoming contact assignable to a plurality of agents of the contact center; determining a respective availability score for each of the plurality of agents according to an agent selection strategy; and associating a respective weighting factor with each of the plurality of agents. Additionally, a respective adjusted availability score is calculated for each of the plurality of agents based on the associated respective weighting factor and the respective availability score; and the incoming contact is routed to one of the plurality of agents based on the adjusted availability scores. The described weighting strategies are particularly beneficial when applying the weighting factor across multiple channels (or media types), where each channel has its own demands.

16 Claims, 4 Drawing Sheets

| Agent Group | Responsibility | Experience | Channel | Availability |
|---|---|---|---|---|
| A | Low value Customers | Inexperienced | Voice, Chat | 100% |
| B | Medium value Customers | Inexperienced | Voice, Chat, SMS | 100% |
| C | Medium value Customers | Experienced | Voice, Chat, SMS, Email | 90% |
| D | Medium value Customers | Mature/Trained | Voice, Chat, SMS, Email, Social | 80% |
| E | High value Customers | Expert | Voice, Chat, SMS, Email, Social, Video | 70% |

MANAGING AGENT OCCUPANCY IN AN OMNI-CHANNEL ENVIRONMENT

BACKGROUND

The present disclosure relates generally to a contact center environment, and, more particularly, to managing multi-channel interaction in a contact center.

Contact center operators and administrators are continually trying to optimize the contact center experience for users (also referred to herein as customers or contacts). A perpetual problem is that of load balancing, i.e. ensuring that the resources of the contact center at any given time are optimized for the number of users connected to or trying to connect to the contact center. A balance has to be struck between the cost of supplying sufficient resources (agents, supervisors, servers, applications, available connection ports, etc.) and the acceptable wait times for users of the contact center.

In many scenarios, the load is not constant and fluctuates significantly between quiet times and busy times. At busy times the users are likely to experience longer queue times and this may lead to users disconnecting due to excessive wait times.

BRIEF SUMMARY

One aspect of the present disclosure relates to a computer-implemented method in a contact center, that includes receiving, by a computer of the contact center, an incoming contact assignable to a plurality of agents of the contact center; determining, by the computer of the contact center, a respective availability score for each of the plurality of agents according to an agent selection strategy; associating, by the computer of the contact center, a respective weighting factor with each of the plurality of agents; calculating, by the computer of the contact center, a respective adjusted availability score for each of the plurality of agents based on the associated respective weighting factor and the respective availability score; and routing, by the computer of the contact center, the incoming contact to one of the plurality of agents based on the adjusted availability scores. The described weighting strategies are particularly beneficial when applying the weighting factor across multiple channels (or media types), where each channel has its own demands.

Another aspect of the present disclosure relates to a system in a contact center that includes a processor programmed to initiate executable operations. In particular, the executable operations include receiving an incoming contact assignable to a plurality of agents of the contact center; determining a respective availability score for each of the plurality of agents according to an agent selection strategy; associating a respective weighting factor with each of the plurality of agents; calculating a respective adjusted availability score for each of the plurality of agents based on the associated respective weighting factor and the respective availability score; and routing the incoming contact to one of the plurality of agents based on the adjusted availability scores. The described weighting strategies are particularly beneficial when applying the weighting factor across multiple channels (or media types), where each channel has its own demands.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

In the present description, an "agent" and a "resource" can both be used to describe a person working at the contact center handling contacts. A contact center "customer" refers to a company or entity that has products and/or services for which the contact center provides support.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communication from a user or a customer. The communications may be by way of any communications medium such as, but not limited to, a telephone call, email, instant message, web chat, and the like. The terms "user" and "customer" denote a party external to the contact center and are used herein to refer to the other party to a contact or a communications session. A user or customer may include, for example, a person having a commercial relationship with the contact center or with a business represented by the contact center.

For each contact received by the contact center, a computer of the contact center will instantiate a "contact object," which may comprise one or more variables, functions, and data structures that represent the contact. Each contact object comprises a number of attributes, which are assigned values based on its corresponding contact. Each contact object can also include pointers, links or references to other data and/or attributes associated with its corresponding contact. The contact object may be passed amongst the different queues, databases, systems, software applications and other computer-based resources of the contact center. Each contact object may also include a forward reference to another contact object and a backward reference to yet another contact object. In this manner, a prioritized list, or queue, of contact objects may be constructed.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated that those individual aspects of the present disclosure may be separately claimed.

The terms "switch," "server," "contact center server," or "contact center computer server" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like. One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions, such as voice, video, and/or instant messaging, and may be used with other IETF protocols to build multimedia architectures including Real-Time Transport Protocol (RTP), Real-Time Streaming Protocol (RTSP), Media Gateway Control Protocol (MEGACO), and the Session Description Protocol (SDP).

Figure 1:
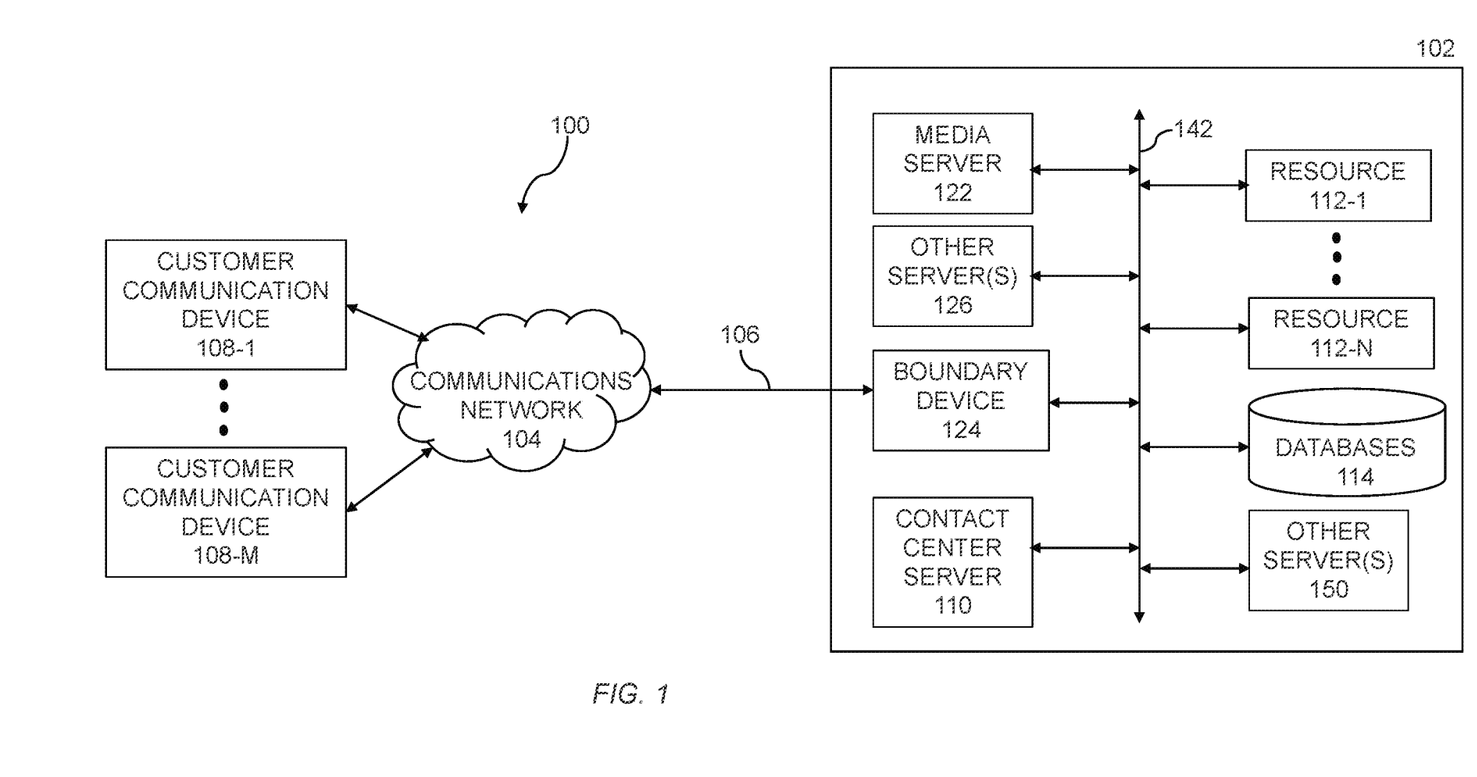
FIG. 1 and FIG. 2 provide an example contact center environment and are provided to illustrate a typical computer-based enterprise architecture in which embodiments in accordance with the present disclosure can be implemented.
Figure 2:
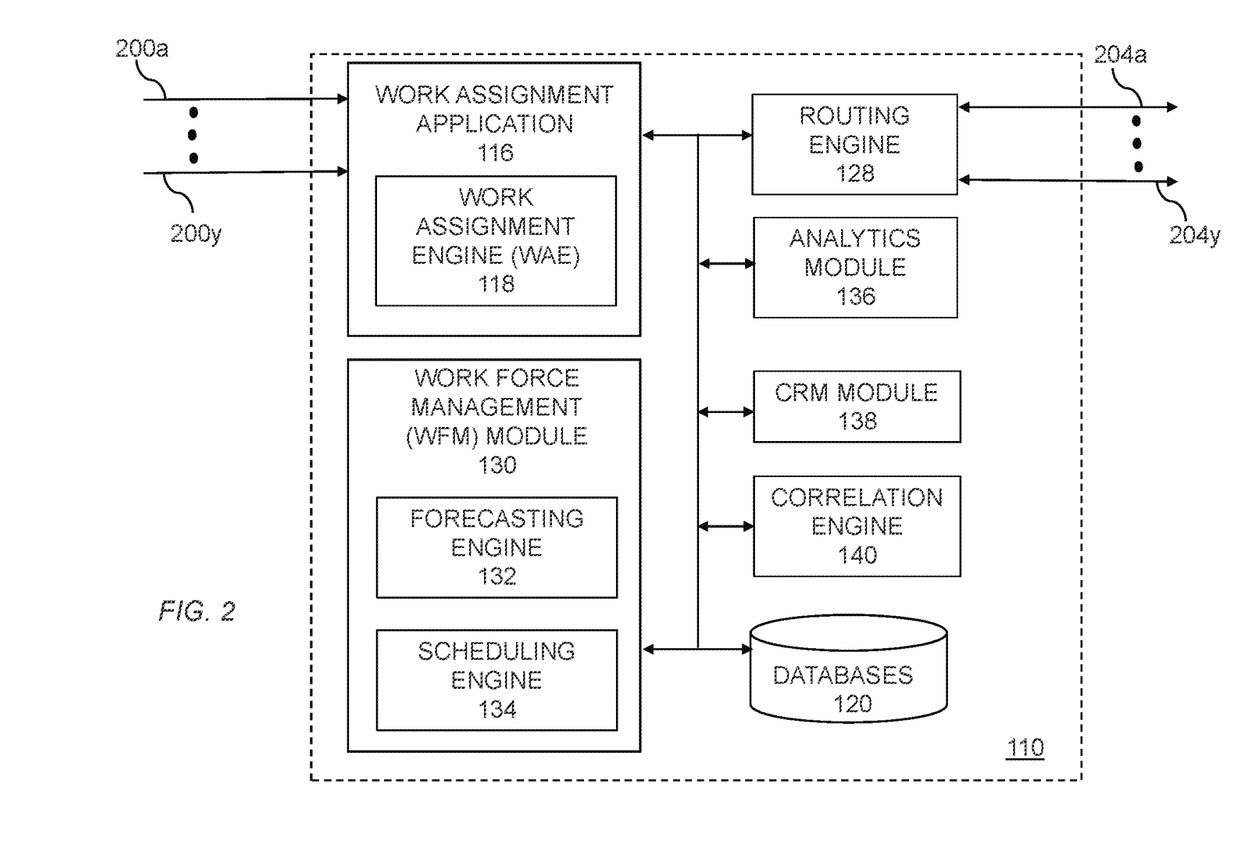

FIG. 1 and FIG. 2 provide an example contact center environment and are provided to illustrate a typical computer-based enterprise architecture in which embodiments in accordance with the present disclosure can be implemented.

FIG. 1 shows an exemplary embodiment of a communications system 100 according to the present disclosure. The communications system 100 may comprise a communications network 104 connecting components of a contact center 102 via a communications link 106 to one or more customer communication devices 108-1 to 108-M, where M is an integer, M 1 (referred to herein collectively as a customer communication device 108). Each customer communication device 108 may be associated with a contact or customer and may comprise, for example, a cellular phone, computer, Personal Digital Assistant (PDA), digital or analog phone, and the like. The communications network 104 may comprise any type of known communication medium or collection of communication media and may use any type of protocols to transport messages between endpoints. The communications network 104 may be packet-switched and/or circuit-switched and may include wired and/or wireless technologies.

The contact center 102 may comprise, for example, a boundary device 124, a central contact center server 110, a media server 122, one or more other servers 126, and a set of data stores or databases 114. The additional servers 126 may include, for example, an Interactive Response unit (IVR), a voice portal, a video call server, an email server, and the like. Some or all of the components of the contact center 102 may be interconnected by an internal network 142 such as a local area network (LAN) or WAN. One or more of the components of the contact center 102 may also be connected via one or more optional communications links (not shown) to one or more other components of the contact center 102.

Although depicted as separate servers and/or applications that are co-located with one another, it should be appreciated that such a configuration of components is not required. For example, some or all of the functions depicted in FIG. 1 may be co-hosted and/or co-resident on a single server and/or processor, e.g., the contact center server 110, and/or two or more of the contact center 102 components may be distributed and connected to one another over the communication network 104, with the communications between these components, may be secured with tunneling protocols or a Virtual Private Network (VPN; not shown). In addition, although one central contact center server 110 is depicted in FIG. 1, two or more servers 110 may be provided in a single contact center 102 or across multiple separate LANs 142 owned and operated by a single enterprise, but separated by the communications network 154. Likewise, two or more media servers 122 may be provided in the contact center 102. In configurations where the contact center 102 includes two or more servers 110 and/or media servers 122, each server 110, 122 may comprise similar functionality, but may be provisioned for providing its features to only a subset of all contact center users.

A customer associated with a customer communication device 108 may utilize the device 108 to generate and transmit a communication, such as a telephone call, an email message, an instant message (IM), an SMS message, etc., over the communications network 104, which is received as a contact at the contact center 102. The contact may be received at the boundary device 124, which maintains a secure separation between the communication network 104 and the internal network 142 and facilitates communications between the customer communication device 108 and the contact center 102. The boundary device 124 may include the functionality of one or more of a switch, a computer-telephony integration (CTI) interface, a SIP gateway, a security gateway, a firewall, a router, or the like. A boundary device 124 comprising a SIP gateway may, for example, connect with one or more SIP trunks from the communications network 104 and split incoming aggregate SIP traffic into individual SIP sessions and aggregate the individual outbound SIP sessions. The boundary device 124 may be implemented as hardware such as via an adjunct processor (as shown) or as a chip in the contact center server 110 (not shown).

Following receipt at the contact center 102, a contact object is instantiated for each contact as described herein and the contact objects are distributed to a plurality of resources 112-1 to 112-N, wherein N is an integer, N≥1 (referred to collectively herein as resource 112). Each resource 112 represents a processing resource of the contact center 102 and may comprise completely automated resources (e.g., processors, servers, or the like), human resources utilizing communication devices (e.g., human agents utilizing a computer, telephone, laptop, etc.), or any other resource known to be used in a contact center 102. In some embodiments, contact objects may be assigned to the IVR (not separately labeled), a voice portal (not separately labeled), or other component of the contact center 102 for automated customer service processing prior to or simultaneous with assigning the contact object to a human resource (e.g., a contact center agent). For example, the voice portal and the IVR may work together to provide IVR services to the contacts.

Each resource 112 may be associated with a resource communication device (not shown), which may be a packet-switched device such as a computer workstation, an IP hardphone or softphone, a packet-based H.320 video phone and conferencing unit, a packet-based voice messaging and response units, a packet-based traditional computer telephony adjunct, a peer-to-peer based communications device, and/or any other suitable communications device. These packet-switched devices may be SIP compatible. The resource communication device may also comprise circuit-switched devices that each correspond to one of a set of internal extensions and may include, for example, wired and wireless telephones, voice messaging and response units, traditional computer telephony adjuncts, and any other suitable communications device.

With reference to FIG. 2, the contact center server 110 may further comprise a work assignment application 116, a routing engine 128, a work force management (WFM) module 130, an analytics module 136, a customer relationship management (CRM) module 138, a correlation engine 140, and one or more database(s) 120. Although each of these functions is depicted in FIG. 2 as residing on the contact center server, it should be appreciated that one or more of the functions, such as the routing engine 128, may reside elsewhere and/or be executed by another server/engine.

Each contact object may comprise one or more work items and generally comprises at least a request for a resource 112. The format of each work item may depend upon the capabilities of the communication device 108 and the format of the communication. In particular, work items are logical representations within the contact center 102 of work to be performed in connection with servicing a particular contact received at the contact center 102 (and more specifically at the work assignment application 116). Work items may be received at the work assignment application 116 from the customer communication devices 108 via one or more customer communications lines or channels 200*a* to 200*y* (which may be one or more trunks, phone lines, etc.) and maintained at the work assignment application 116, a switch or server connected to the work assignment application 116, or the like until a resource 112 is assigned to the work item. As described below, the channels of the contact center can comprise multiple different mediums such that an interaction or contact may occur over multiple types of channels. The work assignment application 116 comprises a work assignment engine 118 that enables the work assignment application 116 to make intelligent routing decisions for work items. As used herein, assignment and/or routing of a contact or contact object to a resource and association of contact attributes with the contact or contact object are intended to be synonymous with assignment and/or routing of the work item(s) associated with the contact or contact object to a resource and association of contact attributes with the work item(s).

The work assignment engine 118 may determine which of the plurality of processing resources 112 is qualified and/or eligible to receive the work item and further determine which of the plurality of processing resources 112 is best suited to handle the processing needs of the work item. In situations of a work item surplus, the work assignment engine 118 may also determine an optimal assignment of a work item resource to a particular resource, e.g., resource 112-1. In some embodiments, the work assignment engine 118 may be configured to achieve true one-to-one matching by utilizing bitmaps/tables and other data structures. Following assignment of the resource 112-1 to a work item, the work assignment application 116 passes the work item to the routing engine 128 to connect the customer communication device 108 that initiated the communication with the assigned resource 112-1 via one of a plurality of resource communications lines 204*a* to 204*y* (which may be a voice- and-data transmission line such as a LAN 142 and/or a circuit switched voice line).

The WFM module 130 may be configured to manage the workforce of the contact center 102 (namely the human resources 112). The WFM module 130 may comprise a variety of functionalities, such as a forecasting engine 132 and a scheduling engine 134, that operate together to achieve optimal management of the workforce. The forecasting engine 132 may monitor current work item volume, current resource availability/utilization, past work item volume, past resource availability/utilization, estimated wait times, service levels, and other objectives and provides a forecast or estimate of the work item volume and required staffing levels in the contact center 102 for a desired shift period. For example, the forecasting engine 132 may be configured to monitor one or more Service Level Agreements (SLAs) between the contact center 102 and one or more clients or customers of the contact center 102 to ensure compliance with the applicable SLA(s).

The scheduling engine 134 uses the information provided by the forecasting engine to schedule human agents, e.g., resources 112, to work in the contact center 102. Additionally, the forecasting engine 132 may automatically identify future resource availability issues (in the short-term or long-term) and notify the scheduling engine 134, thereby enabling the scheduling engine 134 to adjust the scheduling of resources 112 as necessary. In some embodiments, the forecasting engine 132 is capable of analyzing prior and current contact center performance to determine if the contact center 102 will require more or less resources 112 at any particular time, e.g., the beginning or end of a calendar month. The scheduling engine 134 may also be configured to monitor schedule adherence, social media activity, and the like, and the WFM module 130 may enable shift bidding, schedule adjustments, work-at-home resource re-scheduling, and the like.

The analytics module 136 may be utilized to track trends and generate one or more reports that indicate agent performance and overall performance of the contact center 102. In some embodiments, the analytics module 136 may be configured to pull data stored in one or more databases 114, 120 and prepare the data in a human-readable format. The database(s) 114, 120 may be configured to store information about any or all components of the contact center 102 such as statistics related to the WFM module 130 (e.g., resource utilization, compliance with SLA agreements, compliance with objectives, etc.), resource performance statistics (e.g., Key Performance Indicators (KPIs)), and statistics related to the WAE 118 (e.g., decisions per time period, successful routing decisions, estimated wait time, etc.). Advantageously, the analytics module 136 may be configured to run one or more reports for predefined data automatically at predefined intervals. The analytics module 136 may also be enabled to run ad-hoc reports based on inputs received from a contact center administrator or manager. Further still, the analytics module 136 may be configured to run reports in response to a predetermined event or series of events occurring in the contact center 102.

The CRM module 138 may be configured to collect and manage historical customer information, current customer information, information related to interactions between a customer and a contact center 102, customer preferences, customer purchase history, customer return history, customer aliases (e.g., in social media networks), and the like. Such information may be stored and maintained in one or more of the database(s) 114, 120. The CRM module 138 may be utilized to help the contact center 102 provide a more robust and personalized customer service experience. In some embodiments, the CRM module 138 may retrieve desired CRM information from the database(s) 114, 120 to enable one of the resources 112 to more efficiently process a work item for a returning or known customer. For example, when a work item is received in a contact center 102 and the work item is associated with a customer having historical information stored as CRM information in one of the databases 114, 120, the CRM module 138 may retrieve some or all of the CRM information and provide the retrieved information to a resource 112, thereby enabling the resource 112 to provide a more personalized service to the customer.

In some embodiments, the contact center server 110 and its various functionalities may be configured to administer and make work assignment decisions in a queueless contact center, as described in U.S. Pat. No. 8,634,543, the entire contents of which is hereby incorporated herein by reference.

In other embodiments, the server 110 may be configured to execute work assignment decisions in a traditional queue-based (or skill-based) contact center, as described in U.S. Pat. No. 8,234,141, the entire contents of which is hereby incorporated herein by reference. Skill-based contact centers may maintain a resource profile, which includes information related to each resource's skills, level(s) of skill expertise, and training, as well as metrics associated with a plurality of work items serviced by the resource for each resource skill (e.g., contact type, duration, and resolution, ratings from the customer and/or a supervisor, etc.). The resource profiles may be stored, for example, in one or more contact center database(s) (e.g., 114, 120 in FIGS. 1 and 2). This resource information is used to assign each resource to one or more skill groups or resource queues (not shown). When a new contact is received at a skill-based contact center, information about the contact is determined, such as the customer's identity and current needs, customer value, and the resource skill that is required for the proper handling of the contact, and this information, along with additional data such as current contact center queue lengths, is used to assign each new contact to a work item queue (not shown). Some of the information related to the one contact may be maintained in a customer profile, which may also be stored, for example, in one or more contact center database(s) (e.g., 114, 120 in FIGS. 1 and 2). Contacts are assigned to resources based on a comparison of the resource skill required to service the contact and the skillset(s) of each resource. Other servers and applications 150 may also be provided within the contact center.

In further embodiments, the server 110 and its various functionalities are configured to execute work assignment decisions in an attribute-based contact center, such as a contact center using the Avaya Oceana™ Solution. Similar to a skill-based contact center, attribute-based contact centers gather information about customers and assign each contact to a resource based on matching between customer and resource data. However, attribute-based matching provides a match based on a plurality of individual attributes of the contact and the resource, as opposed to matching based on a single "skill" assigned to the contact in a traditional skill-based setting. Attribute-based matching provides more details about the contacts and delivers a greater degree of granularity than traditional skill-based matching, which permits more accurate forecasting of future needs.

In modern contact centers that provide multiple channels or mediums of communication, customers may want to be able to move from one medium/channel to another seamlessly, without needing to be transferred to another agent and without having to explain the nature of their problem all over again. Accordingly, a customer may be able to send pictures, take live video or text reference numbers mid-session and ensure the same agent receives the additional data 'live' as part of the active session which, thereby, includes voice, video and messaging channels. From the perspective of the agent, the agents are able to pick up the thread of their interaction quickly, without the customer having to explain the nature of their problem from scratch. As used herein, a contact center agent can have "omni" capabilities when that agent can handle multiple channels such as voice, video, social media, email, chat, SMS, etc.

EXAMPLE 1

A call to an insurance company arising out of a car accident may start out as a voice contact, then escalate to include a video medium or channel to assess damage, and then include a short message service (SMS) picture of the insurance particulars. Resolving this example requires routing the interaction to an agent with Voice, Video and SMS capability.

EXAMPLE 2

An incoming social media query for a broadband router problem may require a private chat session followed by a voice call to resolve. Resolving this example requires routing the interaction to an agent with Social, Chat and Voice capability.

However, not all contacts will require routing to an agent with multi-channel capabilities; a majority of contacts can likely be resolved with just a single voice or chat session. In other embodiments, a contact center may choose to offer these 'omni' capabilities only to premium customers for a fee, and not to customers perceived to be low value. The value of a customer can be based on data about previous interactions with that customer such as the customer's identity, the customer's organization, the customer's previous purchases. The value of a customer can also be based on data about the present interaction such as the topic of inquiry.

In the omni-channel, or omni-center, environment described above (e.g., a multimedia contact center where agents can interact with customers through multiple media or channels at the same time), groups of agents can have different capabilities and different channel associations. For example, some agents can have the ability to handle 'Chat' contacts, while some will have the ability to handle 'Video' contacts. Not all agents will necessarily be able to handle every channel. For example, only a subset of agents may have video capability as such agents need to look presentable and be suitably trained; not all agents may be authorized for the Social Media channel as businesses typically carefully supervise the messages they post on social media. Less experienced agents or those that handle lower value customers would typically have fewer channel capabilities.

Figure 3:
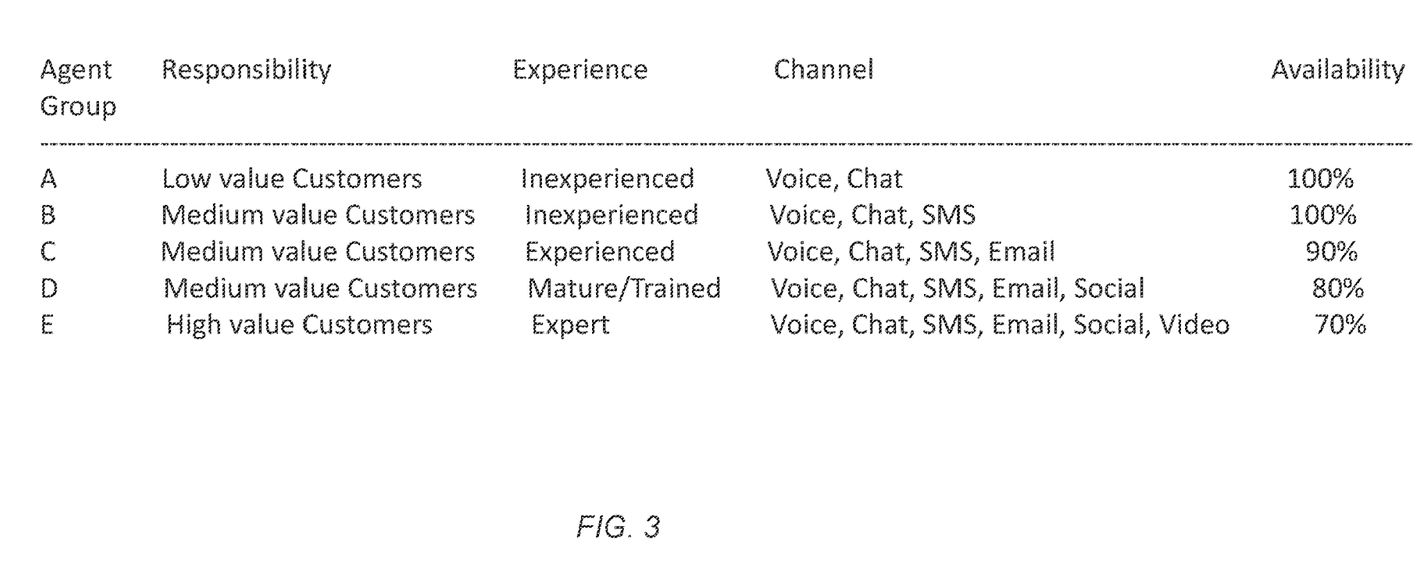
FIG. 3 is a table of agent groups in a contact center in accordance with the principles of the present disclosure.

FIG. 3 depicts a table of an example organization of contact center agents into different groups, each having different channel capabilities. As shown, the agents can be grouped by the type of customers they are responsible for, their experience level, and by the channel capabilities they have.

One goal for contact center administrators is ensuring that there are sufficient agents available with the correct 'omni-channel capabilities' to service demand, while ensuring such agents are not starved of work if there are no, or a low volume of, such contacts. It is possible for example to create a dedicated pool of 'Group E' agents (the last line of the table of FIG. 3) who are reserved for omni-channel interactions only. However, if there are no such incoming contacts, those agents will be idle. Better utilization of such agents may be that the Expert/Group E agents carry out normal work (e.g., single channel Voice-, Email- or Chat-only contacts) most of the time, while still ensuring there is agent capacity to handle omni-channel contacts as required (as the omni-channel contacts are often offered to high-value customers and as such are preferably answered relatively quickly).

There are many conventional agent selection algorithms typically employed by a contact center. As examples, the agent selection algorithms can use selection strategies such as 'Most Idle Agent (MIA)' (i.e., the resource who has been without work for the longest time) or 'Least Occupied Agent (LOA)' (i.e., the resource who currently has the least amount of open work); Avaya's Work Assignment Engine is such an example. If a new piece of work arrives (like a low-value Chat contact), these strategies will normally consider agents from all groups equally. At busy times, this will mean high-value agents (from Groups D or E) will all be busy on low-value interactions. If a high-priority omni-channel interaction arrives that needs immediate attention, there will be a delay handling this interaction (and a possible Service Level Agreement violation). One of ordinary skill will readily recognize that other agent selection strategies may be employed by a contact center.

In accordance with the principles of the present disclosure, an agent selection strategy or algorithm is augmented by applying a weighting when considering agent availability, based on channel capability of that agent. The algorithm would set a factor (e.g., 70%) for example—to high-value Group E agents (see FIG. 3), meaning that such agents are only 'seven-tenths as available' as agents from other groups for low and medium value work. So if there are agents from Groups A, B and C that match the criteria for the incoming work, they are matched in preference to Group E agents. This keeps Group E agents near the bottom of the resource pool. As traffic rates rise, more and more Group A, B and C agents will be assigned work and hence Group E agents will start to be assigned low/medium value work. However, as traffic continues to rise, there will still be capacity to handle high-priority omni-channel interactions, right up until the Contact Center is eventually at full capacity.

The present system and method also contemplates inclusion of a feedback loop, where the work assignment engine, for example, could monitor the operation of the contact center. If the Group E agents remain relatively idle, then the 70% factor, or weight, can be adjusted upward (e.g., 80%) to allow them to be assigned more incoming contacts. If, however, high-value customers are observed to be kept waiting frequently, then the 70% weight can be lowered to lessen the contacts assigned to the Group E agents. The goal is to avoid a situation where a) agents are too busy on low-value interactions to service high-value interactions or b) agents are mostly idle waiting for high-value interactions to arrive. Hence, not only is the agent selection strategy of different agent pools adjusted via the weighting factor, but the occupancy of the different agents and/or agent pools is monitored as well so that the weighting factors can be further adjusted.

In an embodiment, it may be desirable for the strategy to include the ability to reserve a number, or a percentage, of agents in Group E, by applying a 0% weighting at a certain threshold. So even at peak times when every agent is busy on work, a small number of agents can retain capacity to work high-priority omni-channel interactions. This reserve pool can be dynamic such that it will not be the same agents held in reserve all of the time; they are still subject to the MIA and LOA strategies, and will still receive work. Thus, in accordance with the principles of the present disclosure, the reserve pool is not a static administrative function, but rather is a dynamic, automated function.

In another embodiment, the weighting can be applied in various ways. For example, the strategy can apply the weighting on an overall group basis (everybody in Group E has the same weighting) or on an individual agent basis. For example, Agent X may be a skilled closer and so will be given, or assigned, a lower weighting so that he has the most chance of being available for high-priority omni-channel work. One of ordinary skill will recognize that in different contact center environments, other characteristics and abilities of agents may be recognized as valuable and a weighting value can be assigned to cause that agent to be less or more available for different work items.

In a further embodiment, the weighting would be monitored and calculated dynamically by the system based on desirable business rules or desirable metrics—for example, the average number of 'omni-channel' interactions at a given time/day of the week combination. The historical data about the operation of the contact center allows the work assignment engine, for example, to assign weighting factors to different agent groups in order to have agents available to handle the expected contact volume for a given period of time.

In a further embodiment, contact centers can have many mechanisms that can be used to escalate or prioritize 'important' customer calls; so it's often the case that the better/more experienced agents are very busy. Hence, a contact center may sometimes want to ensure that 5 or 10% of callers are sent to novice agents or newly-hired personnel, both to reduce the load and to train up the agents. In this case, a factor of, e.g., 1.5 could be applied for novice agents for simple work items, to make them look 'more available'; and hence gain experience of cross-channel interactions.

'Channel Exclusivity' is a way that has been used to ameliorate this problem in the past. Agents are configured as being 'reserved' on certain channels and only made 'live' on those channels if a threshold is met. Or described in another way, agents are excluded from certain channels unless an overload situation is encountered. The system and method in accordance with the principles of the present disclosure beneficially does not exclude agents from 'overload' channels but instead allows them to accept contacts across all channels, while still reserving capacity for high-priority omni-channel interactions.

Figure 4:
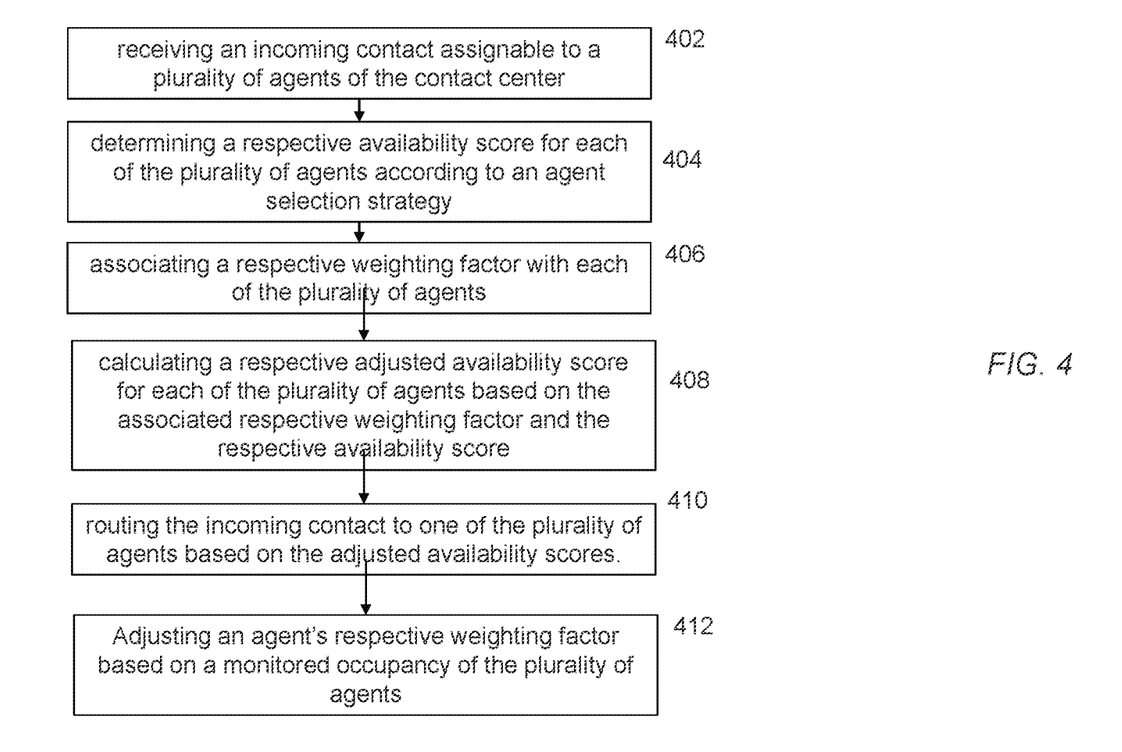
FIG. 4 is a flowchart of an example method to manage agent occupancy in an omni-channel environment in accordance with the principles of the present disclosure.

FIG. 4 is a flowchart of an example method to manage agent occupancy in an omni-channel environment. Within a contact center, one or more agent selection strategies are employed such that when an incoming contact arrives an availability of the different agents is determined. For example, the incoming contact may be routed to the resource or agent who has been without work for the longest time. However, as described above, different agents may be assigned different weighting factors to adjust the selection strategy.

For example, an incoming contact may be a relatively low value interaction and, thus, can be assigned to any of Agent Groups A-E of FIG. 3. An agent X in group E may have been idle for 5 minutes while an agent Y in group C has been idle for 4 minutes. Typically, the incoming contact would be routed to the agent X in group E. However, by assigning a weight of 100% to agents in groups A-D and a weight of 70% to group E agents, the "adjusted" idle time of the agent X would be calculated as (0.70×5=3.5) minutes. Thus, agent Y appears to be idle longer than agent X and the contact is routed to agent Y. In a variation of the above example, an agent Z in group A can be assigned a weight of 1.5. If agent Z has been idle 3 minutes then the weighting factor will cause the agent selection strategy to consider that agent Z has been idle (1.5×3=4.5) minutes. Thus, agent Z would appear to be more idle than either agent X or agent Y and the contact would be routed to agent Z.

The method of FIG. 4 begins in step 402 with receiving, by a computer of the contact center, an incoming contact assignable to a plurality of agents of the contact center. In particular, some incoming contacts may only be assigned to agent group E (see FIG. 3) and in such cases the availability of agents in group A are not relevant. But in the cases where an incoming contact is assignable, for example, to all of the groups A-E, then the method continues in step 404 with determining, by the computer of the contact center, a respective availability score for each of the plurality of agents according to an agent selection strategy.

As discussed above, MIA and LOA are two example agent selection strategies that can be used to calculate an availability score such that the different agents can be ranked in availability. As discussed above, a respective weighting factor can be associated, in step 406, with each of the plurality of agents. Although the above examples did not include multiple weighting factors for a single agent, it is contemplated within the principles of the present invention. For example, referring to FIG. 3, an agent in group E may have 5 different weighting factors associated with him. For work items assignable to only group E, the weighting factor can be 100%. For work items assignable to only group D or group E, the weighting factor can be 90%. For work items assignable to only groups C-E, the weighting factor can be 80%. For work items assignable to only groups B-E, the weighting factor can be 60%. For work items assignable to groups A-E, the weighting factor can be 40%. Thus, an agent can appear to have different availabilities depending on the type of incoming work item.

Availability of an agent is determined in step 408 by calculating, by the computer of the contact center, a respective adjusted availability score for each of the plurality of agents based on the associated respective weighting factor and the respective availability score calculated earlier. As the example provided above, an initial availability score based on an agent selection strategy is multiplied by the weighting factor to arrive at the adjusted availability score. Ultimately, in step 410 the incoming contact is routed to one of the plurality of agents based on the adjusted availability scores. Also as noted above, the method can also include, in step 412, adjusting an agent's respective weighting factor based on a monitored occupancy of the plurality of agents.

In general, the highest volume of inbound contacts is normally for the voice and chat channels. So, according to the process of FIG. 4 applying the specific table of FIG. 3, a member of Group E (as configured via Administration), using the scoring rules or routing strategy described herein that apply when matching resources (agents) to work (calls) would be adjusted to make those agents proportionately less favorable than agents in the other groups. One motivation for doing this could be that as a contact center administrator it is undesirable for agents from high-value groups to be maxed out on low-value work if a video contact from a VIP client arrives (Group E weighting). Another reason may be to prevent agents who deal with detailed technical email queries to be constantly interrupting their work to answer mundane chat queries (Group C weighting).

The chart from FIG. 3 means that if a new Chat contact comes in, and there are suitable agents available from each group A to E, then the routing system applies the weighting factor, which will favor agents from A and B over C, D and E. Everything else being equal, this will lead to agents from group E being 'used up' last, leaving them available for high value interactions. If, some time later, a video contact comes in, there should be an agent from group E free to take the call. The system manages agent occupancy-in other words, filling up in a controlled way the multiplicity slots available to agents for doing cross-channel work.

Furthermore, within group E, there can also be more fine-grained weightings. For example, you could have a weighting like the following:

| Agent Group | Channel | Availability |
| --- | --- | --- |
| E-1 | Video | 100% |
|  | Social | 50% |
| E-2 | Video | 50% |
|  | Social | 100% |

According to this type of weighting, the group E-1 agents should be given Video in preference to Social and vice versa for group E-2.

The weighting process described herein can also apply in the call surplus case (when all agents are active on work). Here, all agents are busy with the contact center operating at capacity and there are waiting calls in the queue. If an agent from group E finishes work (e.g., hangs up a call) then the conventional strategies would be to route the highest priority waiting call to the free agent. In accordance with the principles of the present disclosure, this agent can be 'held back' for a few seconds (to be determined by the weighting)

in case new high-value Video/Social work arrives. If not, then the agent should be assigned the lower value waiting work instead.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A computer-implemented method in a contact center, comprising:
   receiving, by a computer of the contact center, an incoming contact assignable to a plurality of agents of the contact center;
   determining a value for the incoming contact;
   determining a subset of agents of the plurality of agents based on the value of the incoming contact, wherein the value of the incoming contact is associated with an amount of media channel capability of each of the determined subset of agents;
   determining, by the computer of the contact center, a respective availability score for each of the subset of agents according to an agent selection strategy;
   associating, by the computer of the contact center, a respective weighting factor with each of the subset of agents, wherein the subset of agents comprises a plurality of different groups with each agent a member of one of the plurality of different groups and each of the plurality of different groups is associated with a respective group weighting factor and a particular agent's associated weighting factor is the respective group weighting factor of the one of the plurality of different groups of which the particular agent is a member;
   calculating, by the computer of the contact center, a respective adjusted availability score for each of the subset of agents based on the associated respective weighting factor and the respective availability score; and
   routing, by the computer of the contact center, the incoming contact to one of the plurality of agents based on the adjusted availability scores.

2. The method of claim 1, wherein a first set of the plurality of agents associated with a first group of the plurality of groups handles a first number of media channels and a second set of the plurality of agents associated with a second group of the plurality of groups handles a second number of media channels different than the first number.

3. The method of claim 2, wherein the respective weighting factor for each agent of the first set of the plurality of agents comprises a first weighting factor and the respective weighting factor for each agent of the second set of the plurality of agents comprises a second weighting factor.

4. The method of claim 3, wherein the second weighting factor relative to the first weighting factor causes the second set of the plurality of agents to be less available in accordance with the agent selection strategy.

5. The method of claim 4, comprising:
   monitoring an occupancy rate of the second set of the plurality of agents; and adjusting the second weighting factor based on the monitored occupancy rate.

6. The method of claim 5, wherein adjusting the second weighting factor comprises increasing the second weighting factor.

7. The method of claim 5, wherein adjusting the second weighting factor comprises decreasing the second weighting factor.

8. The computer-implemented method of claim 1, wherein the respective group weighting factor is further based on the value of the incoming contact.

9. A system in a contact center, comprising:
a processor programmed to initiate executable operations comprising:
receiving an incoming contact assignable to a plurality of agents of the contact center;
determining a value for the incoming contact;
determining a subset of agents of the plurality of agents based on the value of the incoming contact, wherein the value of the incoming contact is associated with an amount of media channel capability of each of the determined subset of agents;
determining a respective availability score for each of the subset of agents according to an agent selection strategy;
associating a respective weighting factor with each of the subset of agents, wherein the subset of agents comprises a plurality of different groups with each agent a member of one of the plurality of different groups and each of the plurality of different groups is associated with a respective group weighting factor and a particular agent's associated weighting factor is the respective group weighting factor of the one of the plurality of different groups of which the particular agent is a member;
calculating a respective adjusted availability score for each of the subset of agents based on the associated respective weighting factor and the respective availability score; and
routing the incoming contact to one of the plurality of agents based on the adjusted availability scores.

10. The system of claim 9, wherein a first set of the plurality of agents associated with a first group of the plurality of groups handles a first number of media channels and a second set of the plurality of agents associated with a second group of the plurality of groups handles a second number of media channels different than the first number.

11. The system of claim 10, wherein the respective weighting factor for each agent of the first set of the plurality of agents comprises a first weighting factor and the respective weighting factor for each agent of the second set of the plurality of agents comprises a second weighting factor.

12. The system of claim 11, wherein the second weighting factor relative to the first weighting factor causes the second set of the plurality of agents to be less available in accordance with the agent selection strategy.

13. The system of claim 12, wherein the processor is programmed to initiate executable operations further comprising:
monitoring an occupancy rate of the second set of the plurality of agents; and
adjusting the second weighting factor based on the monitored occupancy rate.

14. The system of claim 13, wherein adjusting the second weighting factor comprises increasing the second weighting factor.

15. The system of claim 13, wherein adjusting the second weighting factor comprises decreasing the second weighting factor.

16. A computer-implemented method in a contact center, the method comprising:
receiving, by a computer of the contact center, an incoming contact assignable to a plurality of agents of the contact center;
determining, by the computer of the contact center, a respective availability score for each of the plurality of agents according to an agent selection strategy;
determining a value for the incoming contact, wherein the value of the incoming contact is associated with an amount of media channel capability of each of the plurality of agents;
associating, by the computer of the contact center, a respective weighting factor with each of the plurality of agents, wherein:
the plurality of agents comprises a plurality of different groups with each agent a member of one of the plurality of different groups and each of the plurality of different groups is associated with a respective group weighting factor and a particular agent's associated weighting factor is the respective group weighting factor of the one of the plurality of different groups of which the particular agent is a member; and
the respective group weighting factor is further based on the value of the incoming contact;
calculating, by the computer of the contact center, a respective adjusted availability score for each of the plurality of agents based on the associated respective weighting factor and the respective availability score; and
routing, by the computer of the contact center, the incoming contact to one of the plurality of agents based on the adjusted availability scores.

* * * * *